(12) United States Patent
Yourlo

(10) Patent No.: US 8,027,385 B2
(45) Date of Patent: Sep. 27, 2011

(54) EFFICIENT VIDEO CODING

(75) Inventor: Zhenya Alexander Yourlo, New South Wales (AU)

(73) Assignee: Canon Kabushiki Kaisha, Tokyo (JP)

(*) Notice: Subject to any disclaimer, the term of this patent is extended or adjusted under 35 U.S.C. 154(b) by 1441 days.

(21) Appl. No.: 11/488,779

(22) Filed: Jul. 19, 2006

(65) Prior Publication Data

US 2007/0014353 A1 Jan. 18, 2007

Related U.S. Application Data

(62) Division of application No. 10/020,394, filed on Dec. 18, 2001, now Pat. No. 7,194,033.

(30) Foreign Application Priority Data

Dec. 18, 2000 (AU) ...................................... PR2126

(51) Int. Cl.
*H04N 7/12* (2006.01)
(52) U.S. Cl. ................................ 375/240.08; 348/384.1
(58) Field of Classification Search .................. 348/699, 348/232, 284, 415, 416, 402, 407, 420, 554, 348/558, 564, 565, 584, 384.1; 382/245, 382/232, 244, 285, 173, 190, 266, 236, 243, 382/248, 249, 240, 284, 260; 375/240.24, 375/240.08, 240.16, 240.25, 240.12, 240.01; 345/473, 629, 624, 636, 670, 474
See application file for complete search history.

(56) References Cited

U.S. PATENT DOCUMENTS

| 5,002,062 A | 3/1991 | Suzuki | 128/696 |
|---|---|---|---|
| 5,353,016 A | 10/1994 | Kurita et al. | 340/825.22 |
| 5,601,489 A | 2/1997 | Komaki | 463/44 |
| 5,673,401 A | 9/1997 | Volk et al. | 395/327 |
| 5,745,121 A | 4/1998 | Politis | 345/433 |
| 5,748,789 A | 5/1998 | Lee et al. | 382/243 |
| 5,933,535 A | 8/1999 | Lee et al. | 382/243 |
| 5,949,492 A | 9/1999 | Mankovitz | 348/473 |
| 5,973,475 A | 10/1999 | Combaluzier | 320/107 |
| 5,982,438 A | 11/1999 | Lin et al. | 348/415 |
| 6,014,593 A | 1/2000 | Grufman | 700/136 |
| 6,069,976 A | 5/2000 | Kim | 382/239 |
| 6,075,875 A | 6/2000 | Gu | 382/107 |

(Continued)

FOREIGN PATENT DOCUMENTS

AU 9947329 3/2000

(Continued)

*Primary Examiner* — Behrooz Senfi
(74) *Attorney, Agent, or Firm* — Fitzpatrick, Cella, Harper & Scinto

(57) ABSTRACT

A method (1600) and apparatus (220) for encoding a sequence of images for transmission over a communication network is disclosed. Initially (1602) an object-based first image is rendered from a computer graphics application (240). The rendered first image is then (1604) encoded (226) according to a predetermined encoding scheme and transmitted (1606) for remote display (116). A test (1608) is then performed to determine if any more images are to be rendered. If so, the next (further) image is rendered (1612) from the computer graphics application (240). Changes between the first image and the further image are then determined (1614) from a change indicating output (244,246) of the computer graphics application (240). The identified changes are then used (1616) to determine a manner in which the further image is to be encoded according to the predetermined format. The further image is then encoded (1618) based upon the changes, and transmitted (1620) for remote display. Further images are rendered and encoded using changes from the preceding image.

18 Claims, 12 Drawing Sheets

U.S. PATENT DOCUMENTS

| | | | |
|---|---|---|---|
| 6,229,694 B1 | 5/2001 | Kono | 361/683 |
| 6,580,806 B1 | 6/2003 | Sato | 382/100 |
| 6,636,216 B1 | 10/2003 | Silverbrook et al. | 345/427 |
| 6,795,589 B1 | 9/2004 | Tlaskal et al. | 382/284 |
| 6,985,161 B1 | 1/2006 | Politis | 345/629 |
| 2001/0017616 A1 | 8/2001 | Kobayashi | 345/173 |
| 2003/0212635 A1 | 11/2003 | Kisliakov | 705/41 |
| 2003/0218606 A1* | 11/2003 | Zhirkov et al. | 345/419 |
| 2004/0131267 A1 | 7/2004 | Adiletta et al. | 382/236 |
| 2004/0202248 A1 | 10/2004 | Boroczky et al. | 375/240.12 |
| 2005/0052543 A1* | 3/2005 | Li et al. | 348/222.1 |
| 2005/0151743 A1 | 7/2005 | Sitrick | 345/473 |
| 2006/0290695 A1* | 12/2006 | Salomie | 345/420 |

FOREIGN PATENT DOCUMENTS

| | | |
|---|---|---|
| AU | 9947339 | 3/2000 |
| AU | 9953527 | 4/2002 |
| DE | 3637684 | 5/1987 |
| EP | 0469581 B1 | 10/1999 |
| JP | 59-123986 A | 1/1984 |
| JP | 4-88547 A | 3/1992 |
| JP | 3071329 | 6/2000 |
| WO | 95/35534 | 12/1995 |

* cited by examiner

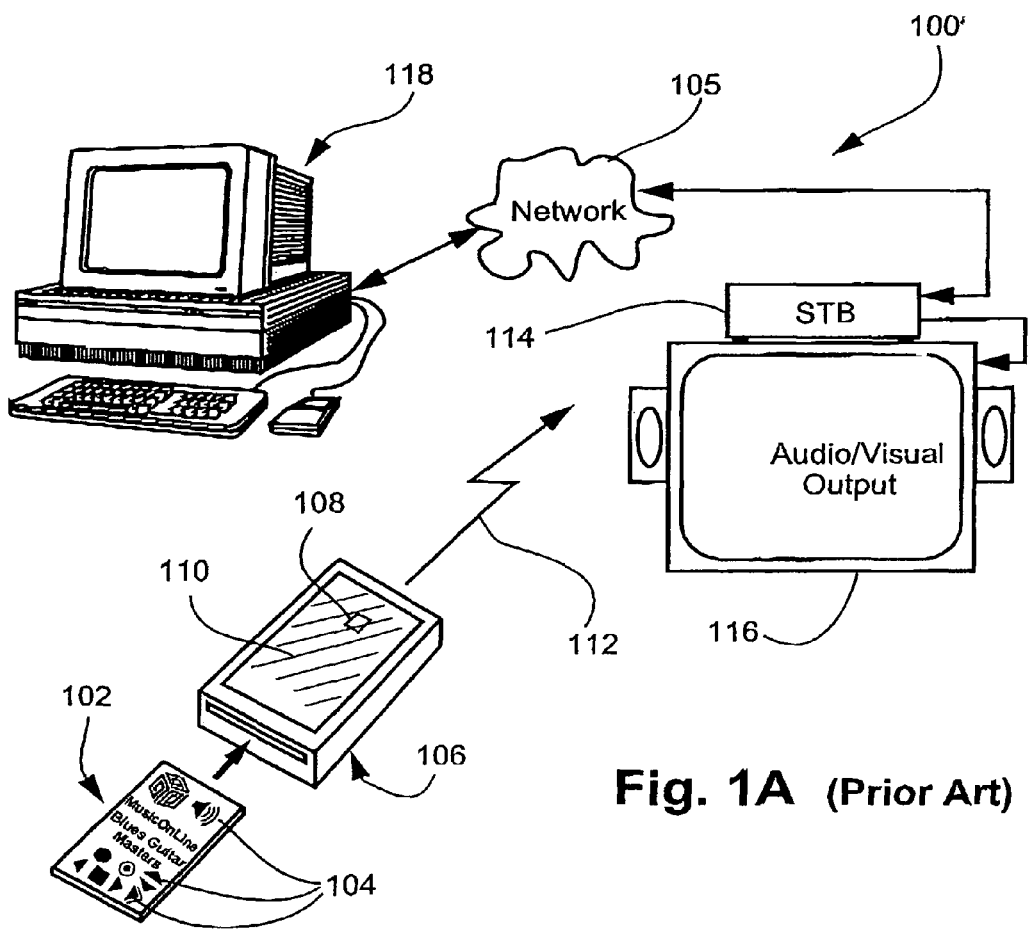
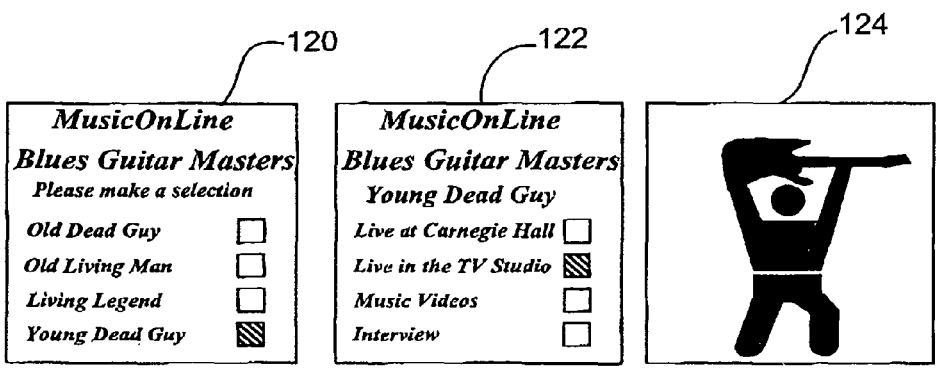
Fig. 1A (Prior Art)
Fig. 1B   Fig. 1C   Fig. 1D

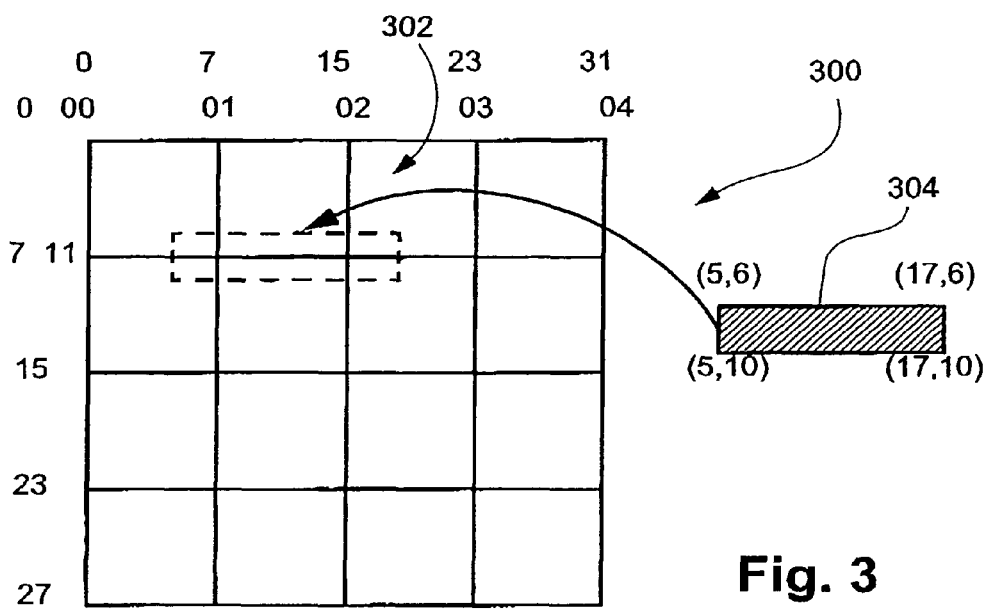
Fig. 3
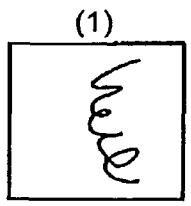 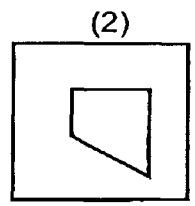 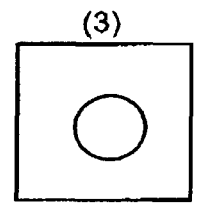 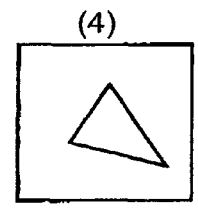
Fig. 4A  Fig. 4B  Fig. 4C  Fig. 4D
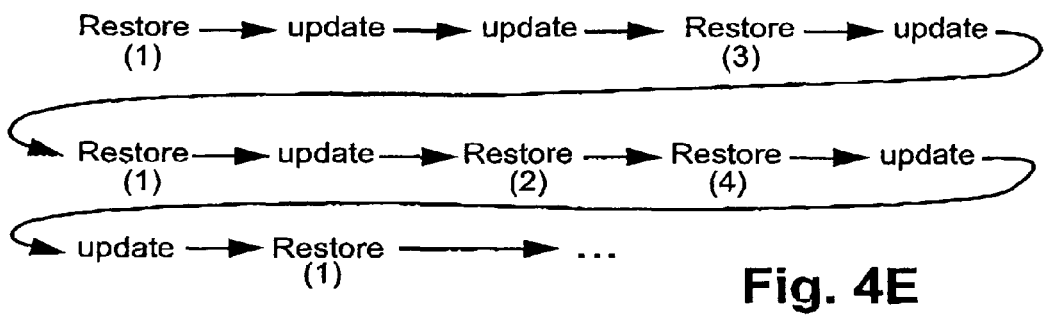
Fig. 4E

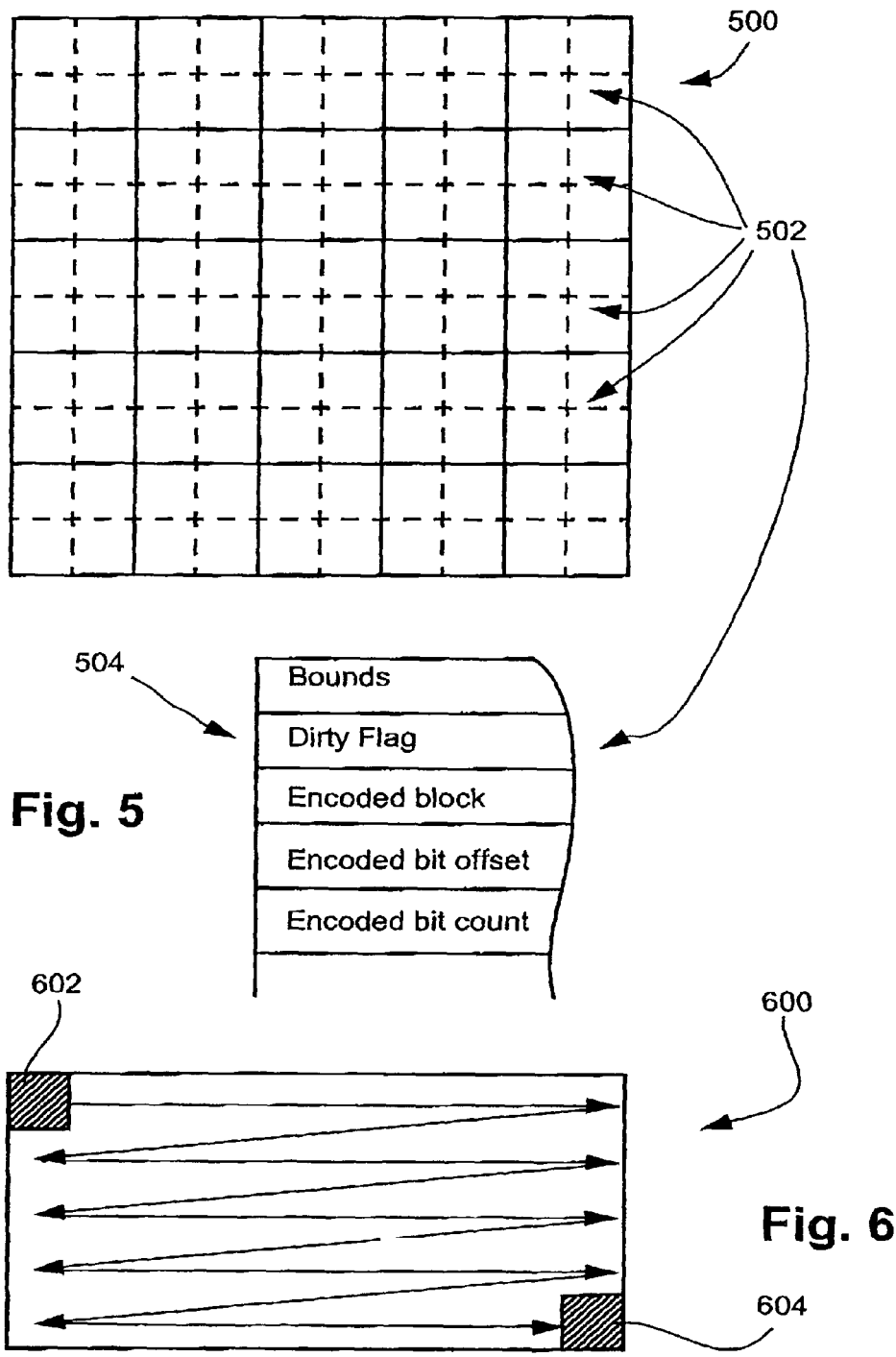

→ RGB → YCbCr for each pixel then DCT

→ RGB → YCbCr for each run then DCT

→ RGB → YCbCr for a pixel

EFFICIENT VIDEO CODING

This application is a divisional of application Ser. No. 10/020,394, filed Dec. 18, 2001, the entire contents of which are incorporated herein by reference.

FIELD OF THE INVENTION

The present invention relates generally to video coding and, in particular, to an efficient approach to the provision of video information from an application source operating from a computer network.

BACKGROUND

Australian Patent Publication No. AU-A-53527/99, corresponding to U.S. patent application Ser. No. 09/414,558 filed 8 Oct. 1999 discloses a customisable user interface system, the salient components of which are illustrated in FIG. 1A. In this regard, FIG. 1A shows a hardware architecture of an interface system 100 where a smart card 102 incorporating a memory arrangement is pre-programmed to facilitate user access to resources available via a computer network 105, such as the Internet. The smart card 102 is provided with a number of icons 104 or the like that are typically each representative of a particular function or access. The smart card 102 is insertable into a smart card reader 106 that is provided with electrical connectors 108 configured to couple to complementary connectors (not seen in FIG. 1A) of the smart card 102 to enable a reading of the data in the memory arrangement thereof. The reader 106 is provided with a transparent touch panel 110 arranged so that when the smart card 102 is inserted into the reader 106 and electrical connection is made, each of the icons 104 are able to be viewed through the touch panel 110 whereby a user can depress the touch panel 110 at a location overlying a particular icon 104 and the reader 106 operates to associate a position output from the panel 110 with a mapping stored within the memory arrangement of the smartcard 102. The reader 106 outputs a signal 112 associated with a function or some other predetermined event related to the selected icon 104. Typically, the reader 106 is a hand-held device and communicates with a computing arrangement, generally formed within a so-called "set-top" box 114, that couples to a user output interface, in this example an audio-visual output device 116, such as a television set. The set-top box 114 operates to interpret the signals 112 received from the reader 106, which may be electrical, radio frequency, or infra-red, and according to a specific, possibly proprietary, protocol. The set-top box 114 converts those signals to a form suitable for communication via the network 105 to cause appropriate transmission to a functional destination, which may for example be a server computer 118. The server computer 118 performs the selected function, which in this case and according to the icons 104 of the particular card 102 illustrated, is the retrieval of on-line music video, and provides data to the set-top box 114 which permits reproduction on the output device 116.

The system 100 is customisable by virtue of the user being able to utilize a number of different smart cards 102 to perform corresponding different operations. For example, whereas the illustrated smart card 102 is used to retrieve and cause reproduction of on-line music video by way of the television set, other functions may be performed such as electronic banking, home shopping, ordering home delivery fast food such a pizza, and the like. In each instance, insertion of an appropriate smart card 102 into the reader 106 causes a corresponding computer application to commence operation, either within the set-top box 114 or within the server computer 118, in order to service user commands entered via the reader 106 and to return appropriate information for audio-visual feedback to the user. For example, associated with each of the above noted functions would typically be one or more menu displays which, in concert with the reader 106, form a graphical user interface on the output device 116 by which the user can check selections being made (eg. pizza style to be ordered, toppings, payment methods) prior to actually confirming each or any function.

An example of this is illustrated in FIGS. 1B to 1D where, having inserted the smart card 102 into the reader 106, the application commences, for example on the server computer 118, and which returns to the set-top box 114 for display on the output device a first menu screen 120 relating to the function to be performed, in this case a selection of "Blues Guitar Masters". Using the reader interface device 106 and by selecting appropriate icons 104, the user can scroll through the various offerings to make a desired selection, in this case for an artist called "Young Dead Guy". A further menu screen 122 is then displayed as seen in FIG. 1C advising the user of the possible selections that may be made. The user again scrolls, and makes a desired selection. The application then retrieves the selection, which in this case is a music video, which is then streamed to the set-top box 114 for appropriate output 124 as seen in FIG. 1D. Since the music video is, in effect, a series of "live" images, as compared to the substantially static images of the menu screens 120 and 122, the music video may advantageously be obtained and/or streamed from another (server) location on the network 105 not associated with the generation of the menu screens 120 and 122.

It follows therefore that the set-top box 114, whether a simple "dumb" device, or an advanced device akin to a desktop or home computer, must be able to interpret and cause appropriate display and/or audio output on the device 116 of a range of data types, which may be sourced from direct video feed from the network 105 in the case of music-video reproduction, static or animated computer graphical representations, bitmap or pixel map (pixmap) images and perhaps via one or more various coding schemes. Further, different data types place differing demands on the network 105 and the application operating within the server computer 118 or the set-top box 114.

In the described example, whilst the ultimate product received is expensive in terms of network usage, it is always desirable to minimize the amount of data required to be communicated over any network. The range of data types that may be used by various applications, dependent upon the smart card chosen by the user at any one time, complicates this issue in that some optimisation processes applicable to some data types may not be suitable for other data types. Related to this point is the general desire for communications to be realised in real-time, or as close as possible thereto. For video streaming, real-time means the appropriate frame rate to ensure seamless viewing (eg. 25-30 frames per second depending on the format being used). However, for menu images and the like, real-time may be any rate which presents the image at a user-acceptable rate, where there is little or no appreciable delay. In some instances this may, for example, be as long as the time taken for a user to look from a hand-held remote control device 106 to the display unit 116, focus and absorb the information contained therein (perhaps 0.1-2.0 seconds).

SUMMARY OF THE INVENTION

It is an object of the present invention to substantially overcome, or at least ameliorate, one or more disadvantages of existing arrangements.

According to a first aspect of the present disclosure, there is provided a method of encoding a sequence of images for transmission over a communication network, said method comprising the steps of:

(i) rendering an first image from a object-based computer graphics application;

(ii) encoding said first image according to a predetermined encoding scheme;

(iii) rendering an second image from said object-based computer graphics application;

(iv) identifying changes between said first image and said second image from a change indicating output of said computer graphics application;

(v) using said identified changes to determine a manner in which said second image is encoded according to said predetermined format; and (vi) repeating steps (iii) to (v) for each subsequent image of said sequence.

In accordance with another aspect of the present disclosure there is provided a method of forming a sequence of images for transmission over a communication network, said method comprising the steps of:

forming representations of plural graphical object-based images;

rendering said images in a sequence using a computer graphics application, said rendering comprising:

determining a set of changes required to transform a previous image in said sequence into a current image in said sequence;

indicating said changes in a format known to an encoder a priori;

encoding said sequence using said encoder such that said encoder utilises at least one of said changes to optimise encoding of said current image.

Apparatus and systems for performing these method are also disclosed.

According to another aspect of the invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which:

FIG. 1A is a schematic representation of a prior art user customizable interface system;

FIGS. 1B to 1D show a number of examples of display output available from the system of FIG. 1A;

FIG. 3 illustrates the updating of MPEG information;

FIGS. 4A to 4E depict how various images may be updated;

FIG. 5 shows MPEG block information;

FIG. 6 shows how no change may be efficiently encoded;

DETAILED DESCRIPTION INCLUDING BEST MODE

Traditional arrangements for delivering multimedia data over computer networks generally use some form of data compression or encoding to minimise transmission bandwidth. Such is particularly the case with Internet communications where static images are often transmitted as JPEG images compressed using discrete cosine transforms or in other forms that use other transform methods. Audio information can also be compressed. There exists some forms of compression that accommodate both audio and visual information and this includes the various MPEG standards. As a consequence, the arrangement of FIGS. 1A to 1D may provide for at least the menus displays 120 and 122 to be delivered in a compressed form using any one of these known or similar standards. Typically, the video stream as seen in FIG. 1D may be delivered as pure video, for example via a cable network, or alternatively in a compressed MPEG form, such a delivery method becoming prevalent over recent years. However, as indicated above, the mere encoding of source information prior to transmission, whilst reducing communication bandwidth, does not necessarily optimise the volume of data to be communicated to a desired minimal level. Further, such encoding does not ensure, or necessarily move towards, substantially real-time display.

Figure 2:
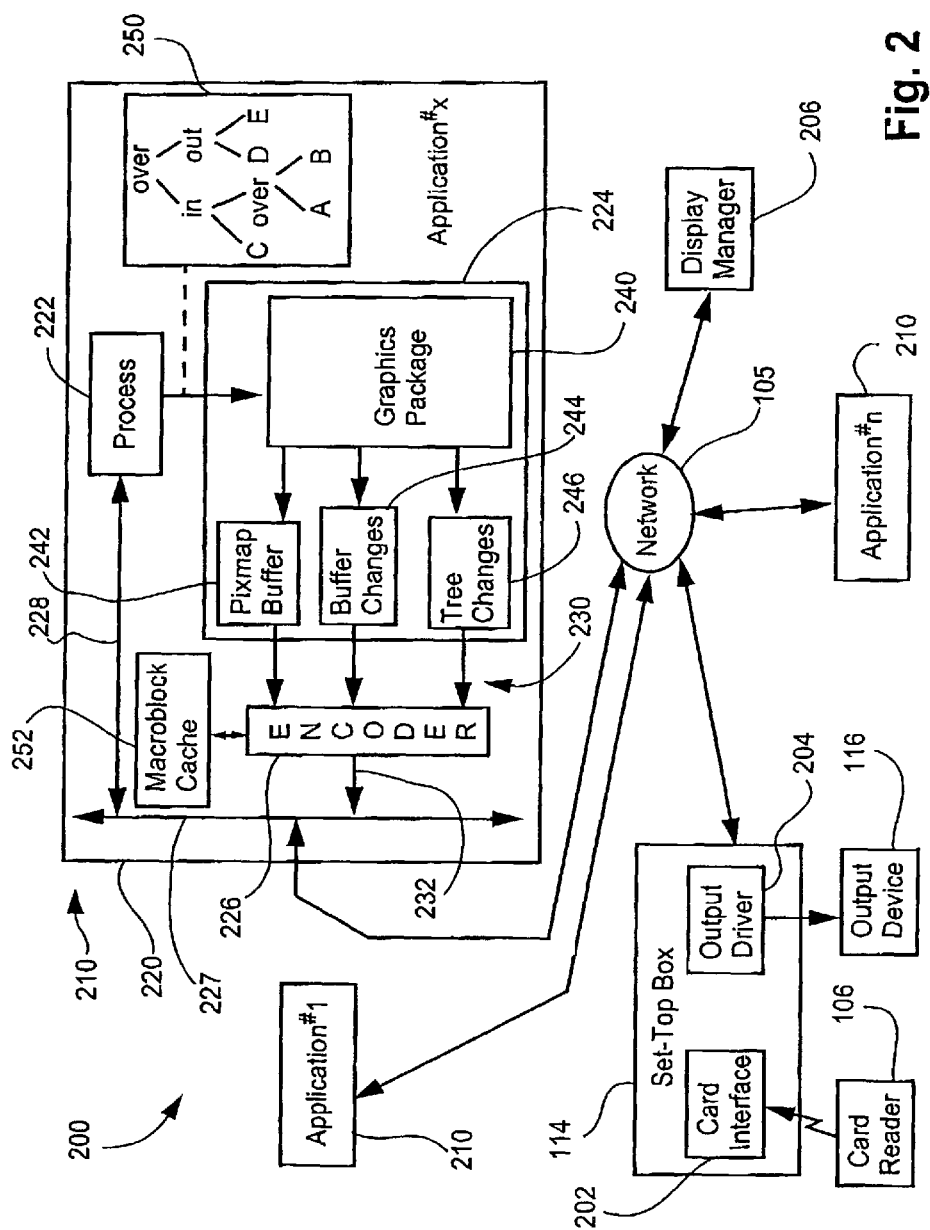
FIG. 2 schematically illustrates an operational architecture with which the system of FIG. 1A may be operated.

FIG. 2 shows an arrangement 200 operable within the architecture of FIG. 1A which provides for optimisations to be made to the data to be communicated via the network 105 in order to provide various outputs to the user using the output device 116.

As seen in FIG. 2, the set-top box 114 incorporates a card interface module 202 which interacts with the card reader 106 to interpret commands arising from user operation of the card reader 106 and for forwarding those commands to an appropriate computer application, such as one of the applications 210 coupled to the network 105. In some arrangements, it may be possible for more than one of the applications 210 to operate simultaneously. Where this occurs, a display manager 206 may be provided to manage the various outputs from the operating applications 210 so that an application 210 of precedence, for example corresponding to the smart card 102 currently inserted in the card reader 106, has precedence for display on the output device 116. In this fashion, the display manager 206 operates with the knowledge of the various operating applications 210 to ensure that the application currently being used by the user has precedence on the output device 116. The display manager 206 communicates output information to the output device 116 via a output driver 204 formed within set-top box 114. The output driver 204 may include a display driver for driving a video or television display as well as an audio driver for driving an audio output device, examples of both of which are found in traditional television receivers.

FIG. 2 also shows the salient features of a exemplary application 220, of the applications 210, which is seen to include three basic modules, being a process 222, an output generator 224 and an encoder 226. The process 222 couples to the network 105 via a connection 228 and an application output bus 217 to receive commands from the set-top box 114 as well as source data from one or more other locations on the network 105 as required by the particular process to be performed. The process 222 provides to the output generator 224 data which is used to create the graphical user interface to be presented to the user via the output device 116. The information generated by the output generator 224 is then provided to the encoder 226 for compression prior to transmission via the bus 217 and network 105 to the output driver 204, typically via the display manager 206. With such an arrangement, a decoder, not illustrated but known in the art and substantially complementing the encoder 226, can operate from within the set-top box 114 to decode display data for reproduction using the output device 116.

It will be appreciated by those skilled in the art, that depending upon the particular nature of the application 220, the extent to which source data is derived from the network 105 and/or other communications that occur via the network 105 as a result of an operation of the process 222, is completely application dependent. For example, if the application were related to the ordering of a home delivery pizza, commands originating from the card interface 202 would be interpreted by the process 222 to identify the style of pizza being ordered, payment and delivery details, and the like. The process 222 may then output to the network 105 invoicing information which may be provided to a third party such as a credit card facility (eg. operating as another of the applications 210) for debiting an account of the user ordering the pizza. Similarly, at the time the debiting is made, the actual order may be delivered to a local pizza manufacturing and delivery service. The provision of such data over the connection 228 relates to the specific process 222 and may not always be bi-directional. For example, where the process 222 incorporates its own data storage relating to products to be delivered, for example the music videos of FIG. 1D, then there would be no requirement for bi-directional communication via connection 228 unless some form of on-line account debiting is desired.

As seen in FIG. 2, the output generator 224 provides graphics output data via a connection 230 to the encoder 226 which provides an encoded output 232 to the bus 217, for communication via the network 105 to the output driver 204 which may incorporate a complementary decoder.

The preferred arrangement described herein makes use of the fact that many output generators 224 incorporate an intelligent image reproduction package such as a graphical reproduction facility which has the capacity of handling graphical objects, including animations, text as well as bit map images. As seen in FIG. 2, the output generator 224 includes a graphics package 240 which, as is typical with such devices, outputs pixel-based information to a pixel mapping buffer 242. The pixel buffer 242 provides pixel-based data to the encoder 226 for conversion into the appropriate encoded form, such as MPEG for example.

The preferred configuration also makes use of the number of facilities of the graphics package 240 so as to achieve optimised encoding, particularly using an encoding scheme such a MPEG, where the image is segmented and encoding performed on the segments. In this regard, the graphics package 240 is preferably configured to receive a hierarchical tree-based display list 250 from the process 222 and from which the particular image to be generated is formed. The graphics package 240 interprets the tree-based display list 250 to perform various compositing and/or rendering functions to provide the pixel-based data for storage in the buffer 242. In addition the graphics package 240 is configured to output further data indicative of changes made in the pixel buffer 242 for each separate screen or frame output. The change data is seen in FIG. 2 as an output 244 from the graphics package 240. The use of the buffer 242 is not essential and both pixel and change data may be supplied directly to the encoder 226 in some to instances.

Also preferably, the graphics package 240 is configured to provide further change data relating to changes in the hierarchical tree 250 used to express the display list. Those changes are indicated as an output 246 of the graphics package 240. Each of the buffer change data 244 and the tree change data 246 are provided to the encoder 232 along with the pixel-based data from the buffer 242 and in the illustrated arrangement collectively form a connection 230. With this arrangement, the encoder 226 is able to perform optimised encoding in a manner to be described making use of the various attributes of the data and the changes being applied thereto.

Figure 16:
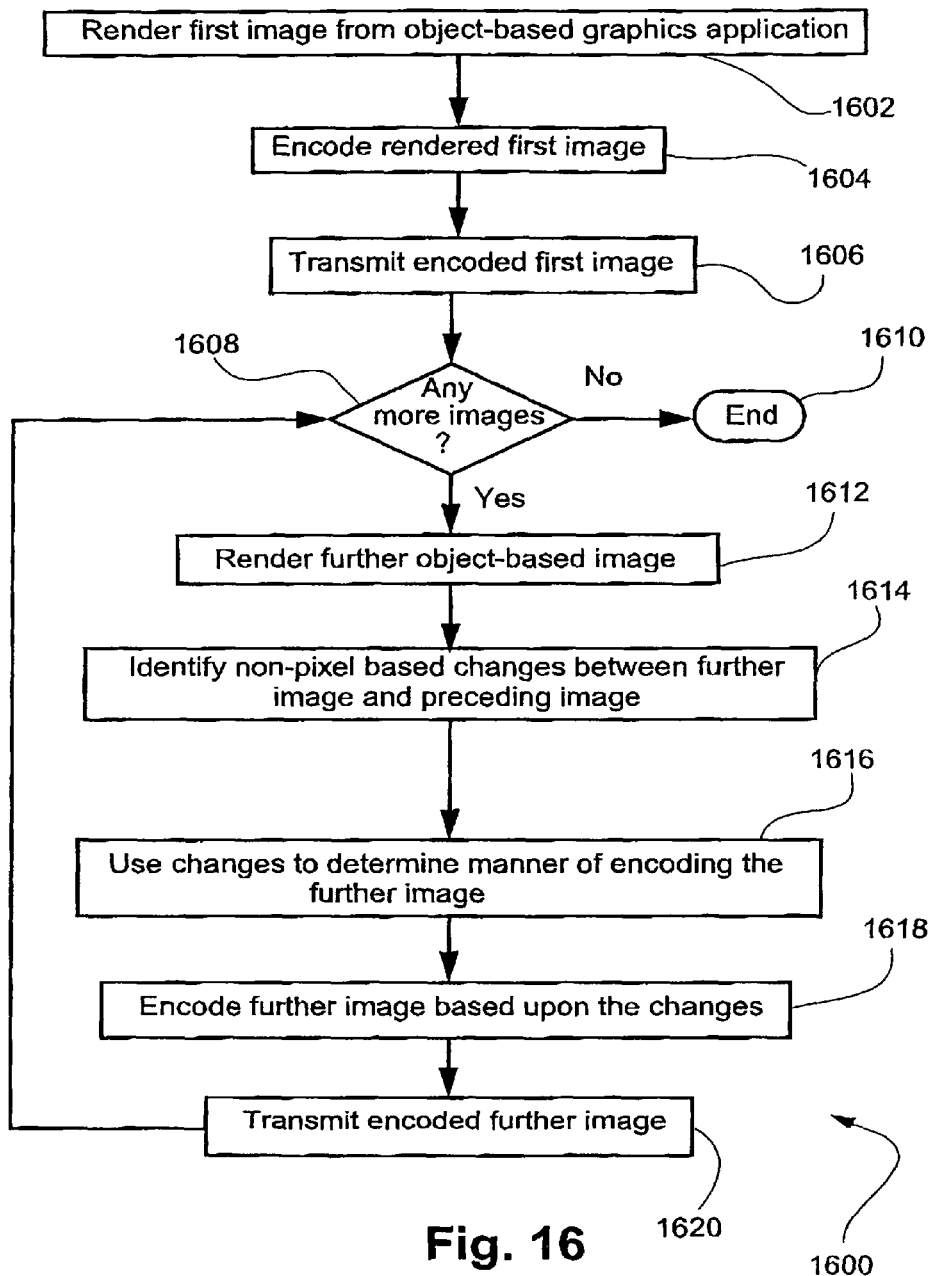
FIG. 16 is a flowchart showing a method of encoding a sequence of images for transmission over a computer network.

A generalised method 1600 of operation for the application 220 is shown in FIG. 16, such method for example being able to be implemented in either hardware, software or a combination of both. FIG. 16 shows a method 1600 of encoding a sequence of images for transmission over a communication network. Initially, at step 1602 an object-based first image is rendered from a computer graphics application 240. The rendered first image is then, in step 1604 encoded according to a predetermined encoding scheme and in step 1606 transmitted for remote display. Step 1608 tests if any more images are to be rendered. If not, the method 1600 ceases at step 1610. If so, the next (further) image is rendered from the computer graphics application 240 at step 1612. Step 1614 follows to identify changes between the first image and the further image from a change indicating output of the computer graphics application 240, such output not being a pixel-based output which would use a pixel-by-pixel comparison of the two rendered images. Step 1616 uses the identified changes to determine a manner in which the further image is to be encoded according to the predetermined format. Step 1618 then encodes the further image based upon the changes. Step 1620 then proceeds to transmit the further image for remote display. Control then returns to step 1608 to determine if any further images are required.

In the MPEG image coding system, each macroblock of a coded stream has a "dirty" flag to indicate if and when the macroblock has been touched by an update. The dirty flag can be used to determine if re-encoding is necessary for an array of macroblocks that form a buffer of the previous frame. This is seen in FIG. 3 where an image 300 is divided into 16 (ie. 4×4) macroblocks and a dirty area 302 of 6 (ie. 3×2) macroblocks (shaded) is indicated as requiring updating when a region 304 of the image has been changed. As seen, the position (location) and area of the region 304 may be to identified.

Below are described a number of approaches for improving the efficiency of MPEG encoding given a source in which the structure of the video image sequence to be encoded is known a priori.

In order for these optimisation to be understood it is appropriate to briefly review the manner in which traditional MPEG encoding occurs. For each frame of video, a pixel map of image data in RGB format is initially supplied. The conversion of the pixel map to an MPEG data stream initially requires converting the RGB data into YCbCr data and forming that data into macroblocks each of 16×16 pixels. Each macroblock is then considered to represent four blocks (each 8×8) pixels of luminance (Y) data, and a single downsampled block (each of 8×8 pixels) for each of chrominance blue (Cb) and chrominance red (Cr) data. A discrete cosine transform (DCT) is then performed on each of these six blocks, giving a number of DCT transform coefficients including a DC coefficient and a number of higher frequency coefficients. The coefficients are then quantised and, for the generation of MPEG I-frames, the DC coefficients are differentially encoded, using the formula:

$$\Delta DC = DC - PDC$$

creating what are known as "DC deltas", along each block. A quantisation step is also performed, typically using run-level coding coupled with a table of variable length cells and results in an MPEG bitstream comprising the differentially encoded DC information and a limited amount of higher frequency information. MPEG data typically comprises Intra (I) frames, and two types of motion predictive frames (P and B-frames). I-frames are used when a major change of information (screen/image content) occurs and typically transport the most data and therefore represent a (relatively) low compression rate. P-frames and B-frames are used for forward and backward prediction of information based on preceding I-frames, and may also be based on preceding P-frames, or for a B-frame, it may be based on a future P or I frame. The extent to which a pixel frame is converted into an I-frame or a P-frame is generally a compromise between the extent of change from the previous frame and the complexity of the image, these factors influencing the decoding time at the set-top box, and representing a trade-off between compression overhead and available bandwidth.

Initial I-Frame Encoding

Applications in general have small number of "main" screens that may be displayed frequently, and to which small updates are made (for instance, changing a text label, or the state of a visible button, as seen in FIGS. 1B and 1C).

The present optimisation provides a mechanism where a representation of the internal structures used to generate an I-frame may be obtained by an application. The internal representation contains all the information necessary to rapidly construct an I-frame representation of the screen with little to no computational overhead.

An application 210 may save and restore a semi-encoded I-frame for each of its screens, thereby eliminating the need to encode a complete I-frame from scratch each time the application needs to alter the look of the entire screen. Also, once a semi-encoded I-frame has been restored, subsequent updates are applied to the restored I-frame representation, and hence only require re-encoding of the changed portions of the screen.

In a specific implementation, this optimisation involves encoding an initial I-frame which is cached in a macroblock cache 252 with a corresponding tag. As seen in FIG. 2, the macroblock cache 252 is associated with the encoder 226 and is provided as a general store for both encoded and un-encoded frames. The I-frame is representative of a "background" upon which future encoded frames, such as the frames 120 and 122 are built. For example, as shown in FIGS. 4A to 4E, an application tags four main screens (FIGS. 4A-4D) that it uses. Each of these screens is encoded into an I-frame. Switching between the screens is allowed. Updates to each screen, such as the addition of text or other graphic objects can be encoded as one or more P-frames, or efficiently as individual I-frames.

In this fashion, as seen in FIG. 4E, an I-frame corresponding to FIG. 4A may be restored and updated with P-frames representative of text or other image components. Dependent on user selection, the background of FIG. 4C may then be restored and updated with P-frames as required. Use of the remaining backgrounds shown in FIG. 4 may follow in a similar fashion.

With reference to the example of FIGS. 1B and 1C, each of the screens shown may be produced from a single cached I-frame corresponding to any background, and the foreground text and graphics (boxes), along with the highlighting of boxes selected by the user being derived from corresponding P-frames, one for each box option.

A further enhancement may be obtained as part of building applications that make use of the optimisation. In this regard, a method of automatically generating (offline) a pre-encoded set of screens (or a subset of the set of screens) that are used is desirable so that they may be restored at run-time with little computational overhead. Such may for example occur upon initial booting of the application 220, and prior to enabling user interaction, thereby ensuring all major screens anticipated for use are available in the cache 252.

Further, a portion of an I-frame may be cached thereby permitting such a portion to be later restored for use.

Super Efficient I-Frame Encoding

In this optimisation, given that the changes made to a frame are known, it is possible to only encode those changes even if it is necessary to generate a complete I-frame. This may be achieved by caching an encoded version of each macroblock within a macroblock structure so that if a macroblock is not "dirtied" by an update, the bit stream encoded version can be directly reused.

A representation of this is illustrated in FIG. 5 where an image 500 is divided into macroblocks 502 and for each macroblock 502 there is retained a record 504 including sufficient data enabling that macroblock to be replaced in a bitstream of macroblocks where that macroblock may be dirtied by an update. In this fashion, rather than considering each frame as a single MPEG encoded bitstream, and caching the frame as in the above noted optimisation, the present optimisation provides for the frame to be cached on a macroblock-by-macroblock basis whereby, as any one macroblock is dirtied, the updated encoded information for the new macroblock may be readily substituted into the bitstream formed of the remaining macroblocks retained in the cache 252. As seen from FIG. 5, the relevant information necessary for retaining a cache 252 of macroblocks includes information representing the boundaries of the macroblock, "dirty" flag indicating whether the macroblock is an original macroblock or has been dirtied thereby indicating whether that macroblock should be used in the output bitstream, and the encoded representation of the macroblock incorporating encoded DC coefficients, an un-encoded DC coefficient and a number of encoded AC coefficients.

Efficient No-Change Bandwidth Optimisation.

Typically, an MPEG-1 video stream requires coding of a constant number of frames per second. Generally, this would greatly increase the amount of computation that an encoder would need to perform within a given time period. However, it is possible to take advantage of the characteristic behaviour of user interaction driven applications to alleviate this problem by way of encoding what is referred to herein as a "no-change" P-frame.

A "no-change" P-frame is encoded in cases where two successive frames to be encoded are identical, and may be encoded with very little computational overhead, and also using only a small number of bits. Fortunately, applications 210 which rely on user-driven interaction, spend a large proportion of execution time waiting for user input, during which time the application 210 displays the same output. Accordingly, during this time, the required frame rate may be attained by generating a sequence "no-change" P-frames until such time as the maximum limit for P-frames is reached (at which point an I-frame must be coded), or until the application 210 needs to update the display.

A "no-change" P-frame is coded by skipping all macroblocks in the frame that do not either form the start or end of a slice. By definition, macroblocks that form the start or end of a slice must be coded in a P-frame or B-frame. Each of the remaining macroblocks is coded using horizontal and vertical forward motion vectors with a size specified as zero (indicating no motion), and with the macroblock address increment set to indicate the number of blocks that have been skipped between each coded block.

For a "no change" P-frame, the previously encoded first macroblock of a slice is retrieved from the macroblock cache 252 and copied into the output stream. This is followed by an address increment, this being a number that is added to the address of the current macroblock, in order to obtain the address of the next encoded macroblock present in the output stream. Finally, the previously encoded last macroblock of the slice is retrieved from the macroblock cache 252 and copied to the output buffer. This process is repeated for each slice within the frame. Thus, a no-change P-frame is made up of a number of slices, each slice conceptually being constructed of an encoded macroblock at the start of the slice, followed by a number of skipped macroblocks, followed by an encoded macroblock at the end of the slice.

An example of this is seen in FIG. 6 where a "no change frame" 600 is shown and which commences and ends with previously cached encoded macroblocks 602 and 604 which, as illustrated are laid out or displayed in a rasterized fashion. As a consequence with this arrangement, since the set-top box 114 has received the previous frame, the set-top box 114 has a decoded version of that frame to be displayed. On receipt of information for the subsequent frame, the set-top box 114 decodes the P-frame noting that all macroblocks that are either the start or end of a slice have been skipped, and hence not changed, and also that the remaining macroblocks have been coded by forward motion vectors of magnitude zero, and hence have not changed. Such an approach provides for the display of each new frame where there has been no change using only a reduced bit-sequence. The specific advantage of this arrangement is that the decoding of the "same as previous" frame is performed within the set-top box and thereby provides for the application 210 to retain without any change the various macroblocks of the frame being displayed. In this fashion, where any macroblock is then updated, that macroblock can be readily changed necessitating the display of a new frame. Such ensures the continual transmission of the MPEG video bitstream without any need to intersperse control data that might otherwise be used to cause the set-top box to display again the "previous frame".

Figure 12:
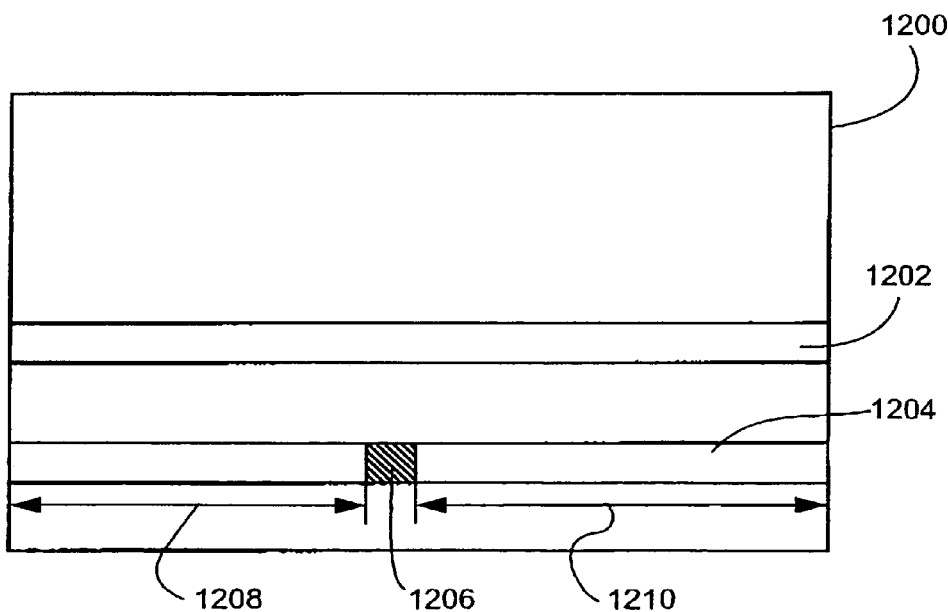
FIG. 12 shows a macroblock updates using slices.

An extension of the above is shown in FIG. 12 where a frame 1200 is shown comprising macroblocks arranged in slices. FIG. 12 shows an untouched slice 1202. A further slice 1204 is shown which includes a dirty block 1206. In this case, since the dirty block 1206 will make the sequence of DC deltas change in the current slice 1204, means that using the method of "Super Efficient I-frame Encoding" described above, to only quantise the DC can be employed for removing non-dirty macroblocks in the slice. In this regard, the macroblocks in the portion 1208 of the slice 1204 may be saved and restored, whereas the portion 1210 must be reprocessed to determine the DC deltas thereof.

P-Frame Encoding

Figure 14:
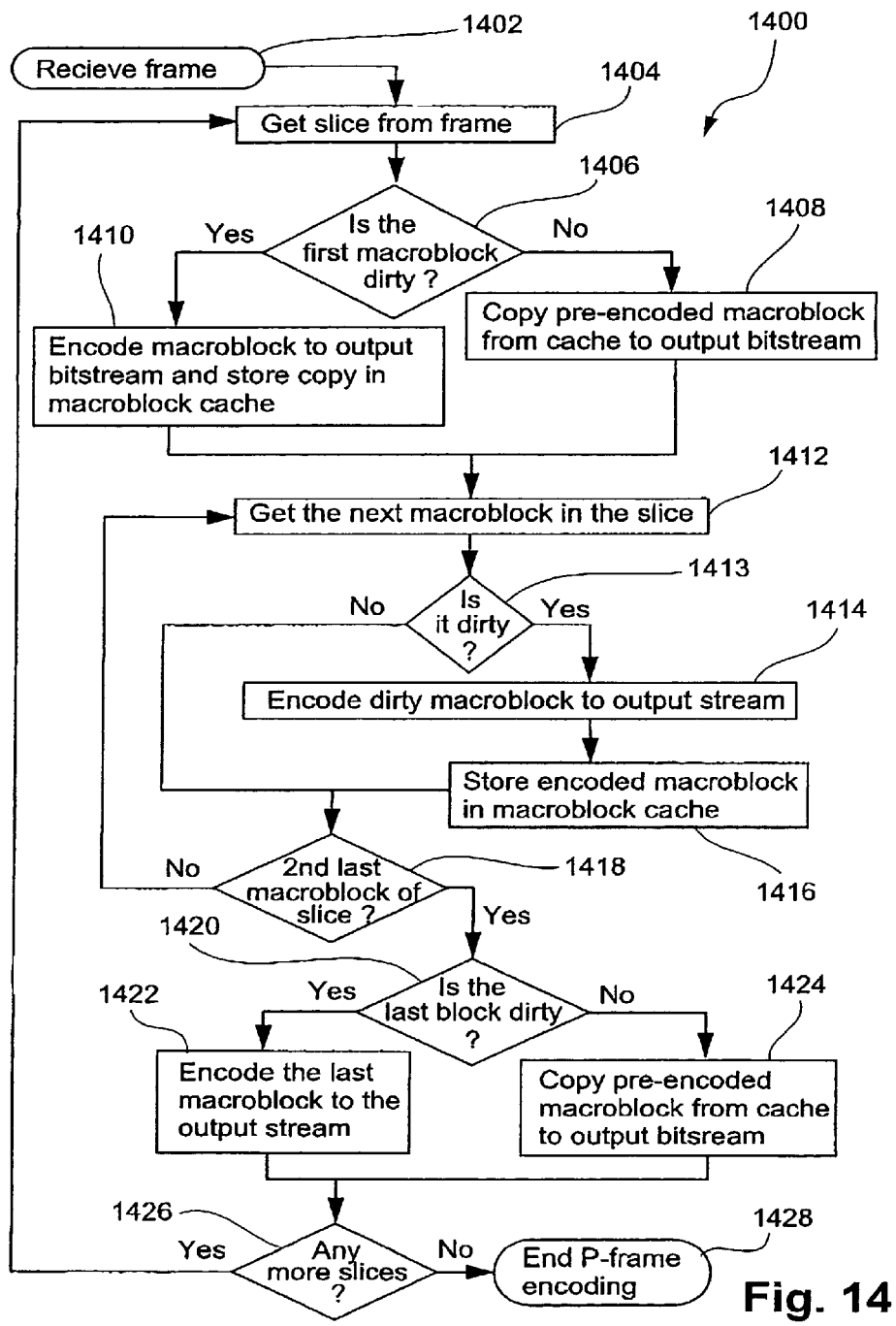
FIG. 14 is a flowchart showing a preferred method of P-frame encoding.

The encoding of P-frames can operate on the same principal, according to the method 1400 shown in FIG. 14. Initially, at step 1402 the frame is received from the pixmap buffer 242 and in step 1404 the encoder 226 gets the first slice therefrom. Step 1406 examines the first macroblock of the slice to determine if it is dirty. If not, step 1408 follows where the pre-encoded macroblock is copied from the macroblock cache 252 to the output bitstream. If the first macroblock is dirty, step 1410 operates to encode the macroblock to the output bitstream and stores a copy of the encoded macroblock in the cache 252. Step 1412 follows each of steps 1408 and 1410 and gets the next macroblock from the slice. Step 1413 tests the macroblock to determine if it is dirty. If not, control passes to step 1418. If dirty, step 1414 encodes the dirty macroblock to the output stream and step 1416 stores the encoded macroblock in the cache 252. Step 1418 checks the macroblock to determine if it is the second last in the slice. If not, control returns to step 1412 when scanning of the slice for dirty macroblocks continues. If the present macroblock is the second last, step 1420 then examines the last macroblock to test if it is dirty. If so, step 1322 encodes the dirty macroblock to the bitstream. If not, step 1424 copies a pre-encoded macroblock from the cache 252. Step 1426 then tests if there are any more slices in the frame, returning to step 1404 if so for processing of the next slice, or ending encoding of a P-frame at step 1428.

Graphics Package

Further encoding efficiencies may be obtained through considering the manner in which the output generator 224 interprets commands from the process 222 to provide output information to the encoder 226. These types of efficiencies may be obtained in various forms and combinations from graphics packages dependent upon the facilities available in each package. For the purposes of the present disclosure, reference is made to U.S. patent application Ser. Nos. 09/387,564 and 09/387,569 both filed 1 Sep. 1999, corresponding respectively to Australian Patent Publication No's. AU-A-47329/99 and AU-A-47339/99, the disclosure of each of which is hereby incorporated by cross-reference. These cross-referenced documents collectively disclose a computer graphics rendering package which receives from a controlling process a display list for an image to be produced, the display list being formed as a hierarchical tree of graphical operations each working upon one or more graphical objects. The graphical objects may include individual graphical shapes, text, combinations of shapes (ie. graphical sub-images), objects formed of pixel-based information, and the like. The graphics package is able to implement a number of graphical operations to achieve a compositing including transparency of the individual objects to provide for a wide range of desired outputs. The above-noted cross-referenced documents provide for a rendering package to be formed having a number of types of output, such as:

(i) Pixel Map (pixmap)
   (ii) Run Length Encoded (RLE); and
   (iii) Plane Fill.

A pixmap requires use of standard MPEG encoding involving RGB to YCbCr conversion for each pixel and then a Discrete Cosine Transform (DCT) of the converted image, as described above.

An RLE segment only requires RGB to YCbCr conversion to be performed once for each run, followed by a DCT. It is also possible to define a run in terms of a colour blend. For example:

Start colour: $R_o$, $G_o$, $B_o$
  Colour Delta: $\Delta R$, $\Delta G$, $\Delta B$
  n-th pixel in the run: $R_o+n\Delta R$, $G_o+n\Delta G$, $B_o+n\Delta B$.
  To achieve this blend in the YCbCr domain:
  (i) Convert $R_o G_o B_o$ to $Y_o Cb_o Cr_o$ including the required offset of 128 for $Cb_o$ and $Cr_o$; and
  (ii) Convert $\Delta R$, $\Delta G$, $\Delta B$ to $\Delta Y$, $\Delta Cb$, $\Delta Cr$ without offsetting $\Delta Cb$ or $\Delta Cr$ by 128.
  Therefore:
  n-th pixel in the run: $Y_o+n\Delta Y$, $Cb_o+n\Delta Cb$, $Cr_o+n\Delta Cr$.

The conversion from RBG to YCbCr is a linear transform defined by:

$$\begin{bmatrix} Y \\ Cb \\ Cr \end{bmatrix} = \begin{bmatrix} 0.2990 & 0.5870 & 0.1140 \\ -0.1687 & -0.3313 & 0.5000 \\ 0.5000 & -0.4187 & -0.0813 \end{bmatrix} \begin{bmatrix} R \\ G \\ B \end{bmatrix}$$

A plane fill does not require a Discrete Cosine Transform (DCT) since it is just a DC level, and requires only one RGB to YCbCr conversion. It will further be appreciated that the pixmap approach is the least efficient and that the plane fill approach is the most efficient of the described alternatives.

Figure 7A:
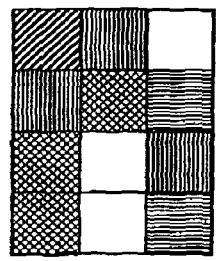
FIGS. 7A to 7C show various conversions for different data structure.
Figure 7B:
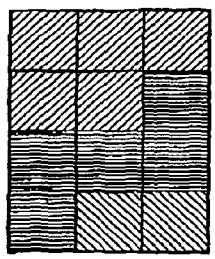
Figure 7C:
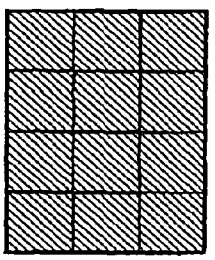

This is seen in FIGS. 7A to 7C. FIG. 7A shows a portion of a simple pixel map image in which there is no particular relationship between the colour displayed between adjacent pixels and the like. It follows that for such an image, individual conversion of each pixel is required. In FIG. 7B, it is apparent that the pixels are arranged in runs of various lengths and that for each one, only a single conversion need be performed. Accordingly, for FIG. 7A whereas a total of 12 conversions would be required, FIG. 7B would require six conversions, these being the total number of runs for the display lines indicated. In FIG. 7C, the plane fill has only a single pixel value for the entire graphical object. As a consequence, only a single conversion need be performed and the conversion need only be limited to obtaining the DC value since there is no higher frequency content across the entire macroblock.

Motion Prediction

This optimisation makes use of the original tree 250 from which the image is composited, and the transformation matrices that correspond to the nodes in the tree 250, it is also possible to predict the motion of individual components of a scene to enable greater compression.

For example, returning to FIG. 2, it is seen that the nodes in the expression tree 250 are particular graphical operations (eg. over, in, out) which act upon the graphical elements (A, B, C, D, and E) to achieve the desired composited output. The arrangements disclosed in the cross-referenced documents provide information of changes to the expression tree 250 which are output 246 as illustrated. Those changes may include, for example, the omission of the graphical object B from the tree 250, which would result in a simplified expression tree incorporating the operation A in C as one component thereof. With such changes in the expression tree 250 being flagged at the output 246, the encoder 226 is able to identify those macroblocks in which the graphical object B was represented and therefore is able to immediately dirty those macroblock and provide only for the re encoding of those macroblocks as output from the graphics package 240 via the pixel map buffer 242. Accordingly, even where there exists a change in the expression tree 250 which creates a new frame of output, again only those portions of the output that change need be identified. Specifically and importantly, the use of the graphics package to identify those portions that have changed as opposed to some other detection arrangement greatly increases the speed at which encoding can be performed and therefore the rate at which data can be delivered to the set-top box 114.

Handling Neighbouring Macroblocks

Figure 8:
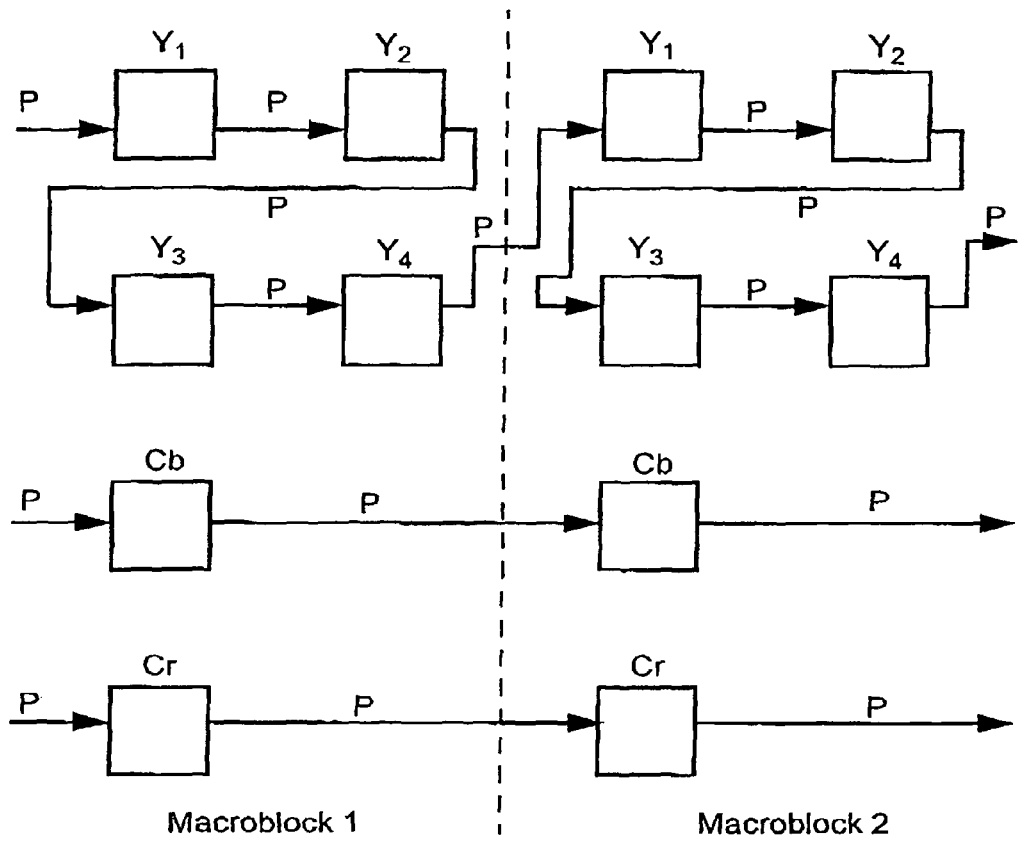
FIG. 8 illustrates the predictive encoding of DC coefficients.

For each macroblock, the DC coefficients are encoded predictively as illustrated in FIG. 8. As seen in FIG. 8, encoding of a I-frame occurs on a macroblock-by-macroblock basis whereby each of the YCbCr components are processed according to their division into the macroblock. As discussed earlier, for each macroblock there are four luminance (Y) components and the two separate chrominance (Cb, Cr) components. As seen from FIG. 8, each of the luminance components for a macroblock are progressively encoded into the I-frame and then encoded in sequence onto the luminance components for the next macroblock. A similar arrangement occurs with each of the chrominance components.

Figure 9A:
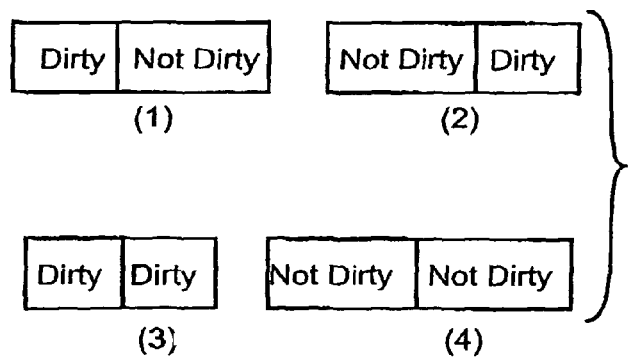
FIG. 9A shows the possible cases for neighboring macroblocks.

Accordingly, for the cases in which some (neighbouring) blocks are dirtied, and require re-encoding, it is necessary to treat the DC coefficients in a special manner to ensure that they are correctly encoded. FIG. 9A shows the four possible cases for dirty and non-dirty neighbouring macroblocks. The present inventor has therefore determined that within each macroblock, it is desirable to have a pointer to the previous block. Further, it is also desirable to store the current DC value within each block so that it can be obtained as needed. For some cases, it is possible to avoid quantisation of macroblocks and reuse the bit stream corresponding to an individual macroblock.

When encoding I-frames, the DC component of each macroblock is referenced from the previous macroblock in scan-line order:

$$\Delta DC = DC - PDC$$

If the macroblock is the first macroblock in a slice, the DC value is reset to a known initial value (eg. 1024 in MPEG-1). This means, that if there is an uninterrupted sequence of non-dirty macroblocks from the start of a slice, then it is possible to simply restore a previously cached bitstream version of each macroblock that comprises the sequence. If, however, a macroblock after the first macroblock in a slice is marked as dirty (and hence needs re-encoding), the cached bitstream representations of subsequent macroblocks cannot be used, since the chain of DC delta values will no longer be correct.

This situation may be corrected by using a cached, quantised version of each macroblock subsequent to one that has been encoded and to only update and quantise the DC component. Each of these macroblocks may then be coded into the bitstream, restoring the chain of DC delta values.

Figure 9B:
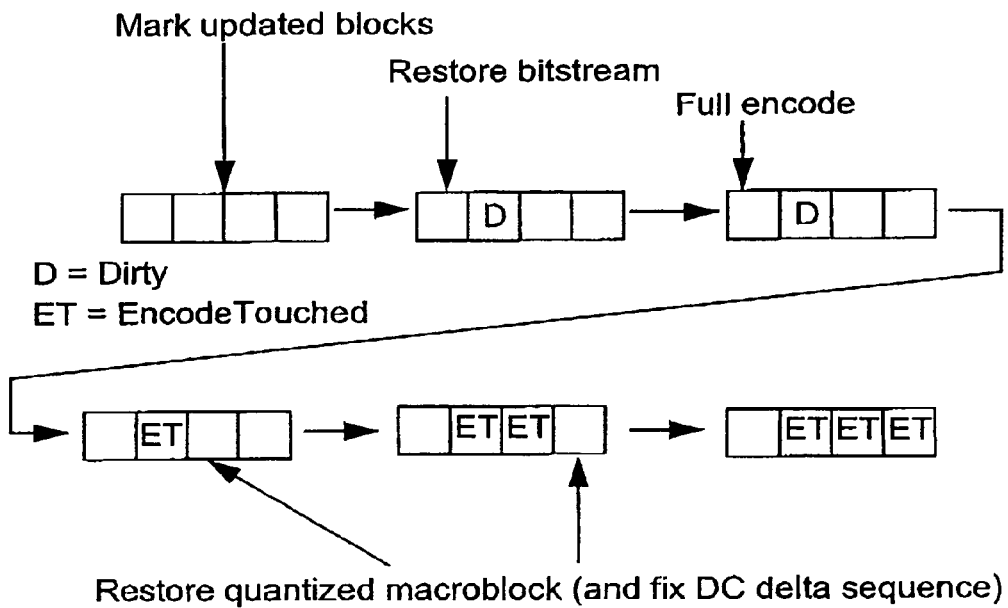
FIG. 9B depicts Dirty and EncodeTouched flag marking.

In order to facilitate this optimisation, and as illustrated in FIG. 9B, an EncodeTouched flag is used. The EncodeTouched flag is set on any macroblock that has been previously marked as dirty (and subsequently re-encoded), and also on any block for which the previous block has had its EncodeTouched flag set. This allows the encode function to check whether the previous macroblock, in scanline order, has had its DC value modified, so that a decision can be made as to whether to use the cached bitstream representation, or cached quantised versions of macroblocks comprising the remainder of the slice.

It is also possible to use the method of encoding described above to quickly produce I-frames from the cached macroblocks. For example, a sequence commonly contains a number of P-frames although this number is limited by the MPEG standard. The standard states a maximum number of consecutive P-frames which may be present in an MPEG stream between I-frames. Thus, it is possible to encounter a situation where a P-frame may be adequate to encode a given frame but where the standard dictates that the frame must be an I-frame.

Figure 15:
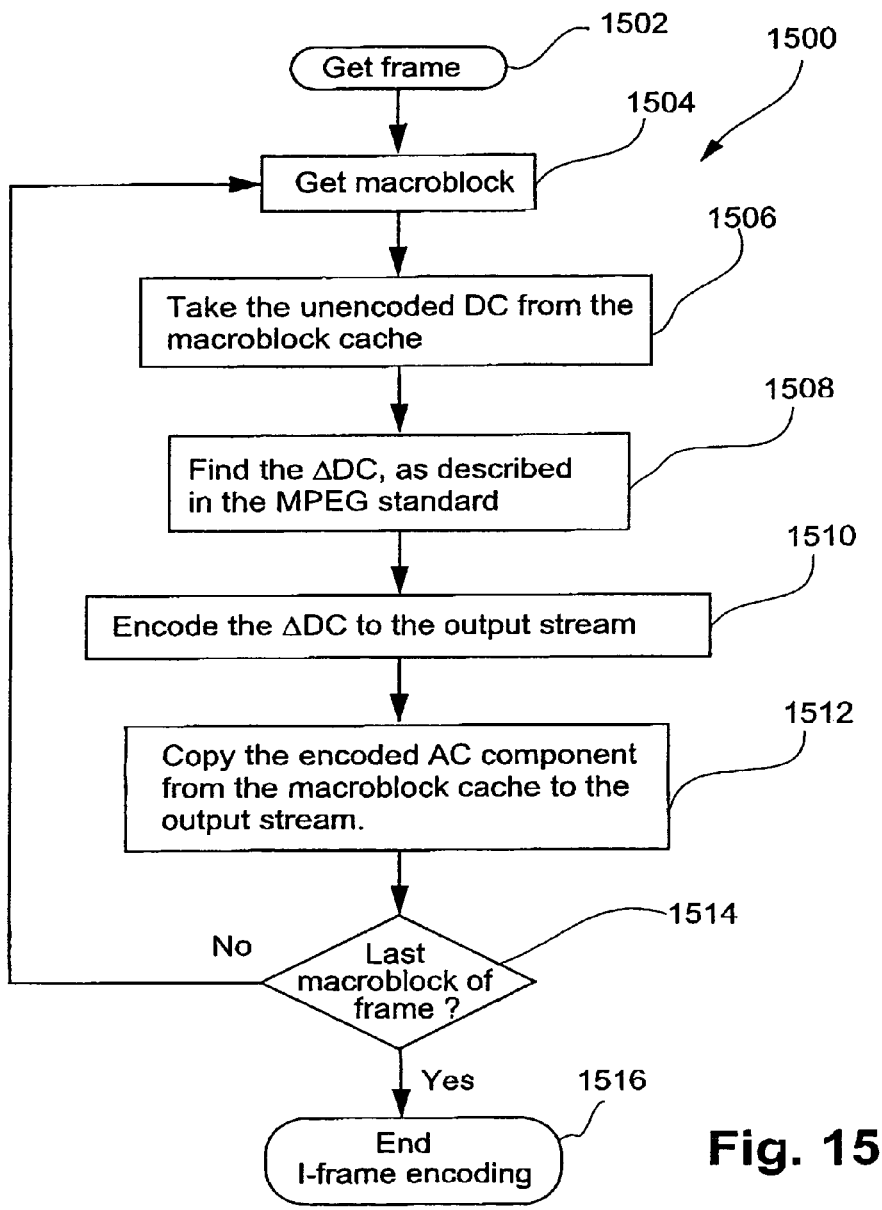
FIG. 15 is a flowchart showing a preferred method of I-frame encoding.

The above method of encoding is useful when difference or P-frames have been encoded between I-frames. Since the DC is encoded differently for I and P-frames, the encoded macroblocks cannot be simply copied out from the macroblock cache 252. However, the I-frame can still be encoded quickly by the procedure 1500 shown in FIG. 15. At step 1502, a frame is obtained from the pixmap buffer 242 by the encoder 226 and step 1504 gets the first macroblock from the frame. Step 1506 then takes the un-encoded DC component from the macroblock cache 252 and step 1508 finds the ΔDC value as defined in the MPEG standard. Step 1510 then encodes the ΔDC value to the output stream. Step 1512 then copies the encoded AC component from the macroblock cache 252 to the output stream. Step 1514 test to determine if any blocks remain in the frame. If so, control returns to step 1504 for processing that block. Otherwise, the method 1500 ends the formation of an I-frame at step 1516.

Update Dirty Flag Numbering

Figure 10:
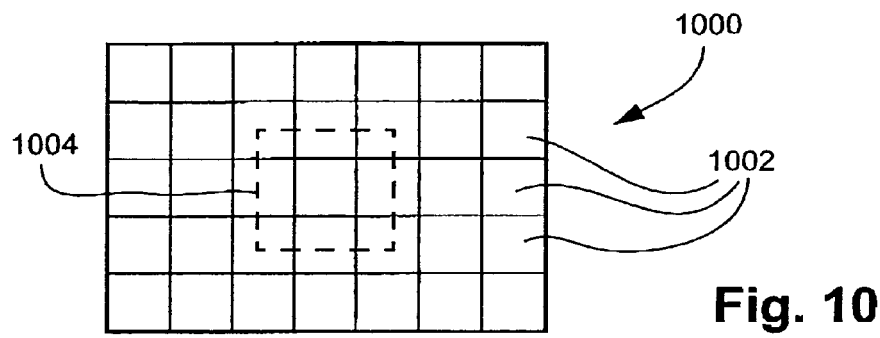
FIG. 10 shows the marking of update dirty flags.

It is necessary to determine the set of macroblocks touched by an update. This is seen in FIG. 10 where a screen display 1000 has macroblocks 1002 and an update region 1004 as indicated. Within the region 1004 it is appropriate that each of the macroblocks that have been dirtied and which to define the region 1004 should be numbered in an orderly fashion so that the corresponding macroblocks of the previous frame can be readily identified and substituted with newly encoded macroblock information.

Such necessitates an efficient method for caching macroblocks that are to be used as part of an I-frame, as discussed below.

Caching Methods

Figure 11:
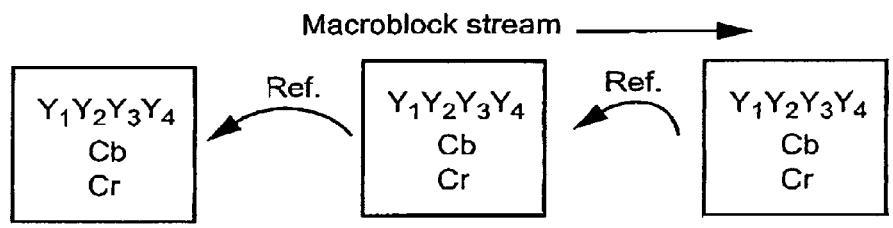
FIG. 11 shows a method of caching macroblocks.

A method for caching macroblocks for reuse initially requires storing the delta for the DC component of each part of the macroblock (4×YCbCr) within the macroblock structure. Also stored is a reference from each macroblock to the previous macroblock, as discussed above. This is illustrated in FIG. 11 where each macroblock structure includes a reference pointer to previous macroblocks in the stream, forming a chain of reference pointers between macroblocks in reverse scan order.

After each macroblock has been transformed using a DCT, the macroblock is quantised and stored for later retrieval. Each macroblock is also given a "dirty" flag, which may be marked is either "dirty" or "not dirty".

For each macroblock that is marked as dirty, the following steps are performed:
  (i) apply a DCT;
  (ii) calculate the DC delta (ΔDC=DC−P) and save the DC values;
  (iii) quantise the macroblock;
  (iv) save the macroblock;
  (v) encode the macroblock (bit stream encoding);
  (vi) save the bitstream version; and
  (vii) set dirty flag to false. (ie: not dirty).

For each macroblock that is marked as not dirty, and is not preceded by dirty blocks since the start of the current slice, the macroblock can be restored from the bitstream encoded version.

A number of functions may be defined, these being:
  (a) Cached DC delta—A delta is performed on the DC components using the stored values, and the delta values are then placed in the macroblock.
  (b) DC quantise—a quantisation is performed only on the DC values in the macroblock.

For each macro block that is not marked as dirty, but preceded by a macroblock marked as dirty since the start of the current slice, the following steps are performed:
  (i) restore the cached DC values;
  (ii) calculate the DC delta;
  (iii) quantise the DC portion of the macroblock;
  (iv) encode the macroblock (bit stream encoding); and
  (v) save the bitstream encoded version.

Figure 9C:
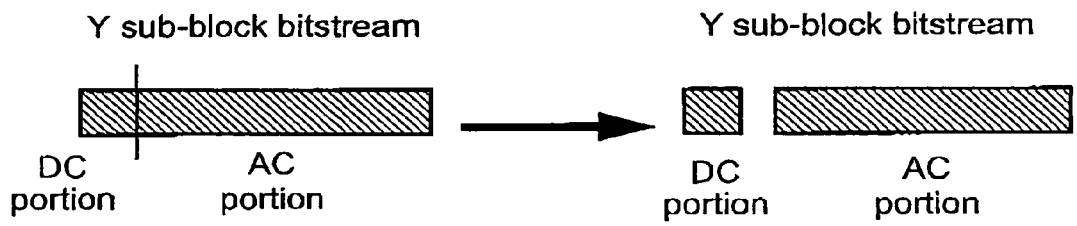
FIG. 9C shows one method for caching and restoring macroblocks that are after a dirty block but before the start of a new slice.

An alternative method for caching and restoring macroblocks that are after a dirty block, but before the start of a new slice, involves the saving of the bitstream encoded version of the AC coefficients that comprise a macroblock separately from the DC coefficients. This is seen in FIG. 9C.

For blocks that are after the start of the slice (or are the start of a slice) and have not been preceded by a dirty block:
  (i) restore the DC portion of the bitstream; and
  (ii) restore the AC portion of the bitstream;
  or, if the bitstream is cached as DC+AC, DC, AC:
  (i) restore the DC+AC cache bitstream.

For blocks that are dirty:
  (i) apply DCT;
  (ii) calculate ΔDC and save the DC values;
  (iii) quantise;
  (iv) encode and save the DC values; and
  (v) encode and save the AC values.

For blocks that are not dirty but are preceded by a dirty block in the same slice:
  (i) calculate ΔDC;
  (ii) quantise the ΔDC;
  (iii) encode and save the DC; and
  (iv) restore AC bitstream.

Short-Circuit of DCT

Given that each macroblock that has been updated can be marked with the type of update that has been performed, it is possible to thereby identify the set of macroblocks that have been updated by way of a plane-fill. It is possible to efficiently transform these macroblocks by using a simplified version of the DCT, since it is known in advance that the resulting transform domain representation will consist of a single value (namely the DC level for each macroblock).

Macroblock Level Screen Transitions

Related to the ability to save and restore I-frame representations of main screens required by applications 210, is the ability to construct transitions between cached I-frame representations based on their macroblock representations.

This may be achieved by restoring a cached I-frame into a temporary transition buffer, for example within the encoder 226, and then performing macroblock-sized operations (with associated encoding between a specified number of operations) to cause the contents of the transition buffer to be copied into a frame buffer, being another part of the encoder 226. This can be achieved with high efficiency, given that both representations of an I-frame contain cache macroblocks in both bitstream and quantised forms that may be encoded into a complete I-frame with little overhead.

Some of examples of transitions that may be possible using this technique are:
  (a) mosaic effect wherein a certain number of macroblocks are pseudo-randomly copied from the transition buffer to the frame buffer between the generation of each frame;

(b) slide-on/slide-off effect wherein macroblocks in the target frame are migrated towards one edge of the buffer, with macroblocks from the transition frame copied to fill the space created; and (c) a spiral effect wherein macroblocks from the transition frame are copied in a spiral pattern into the target frame.

Motion Prediction from Affine Transform Matrices

Given that the hierarchical render-tree 250 is made up of nodes, each of which may be associated with a number of transformation matrices, it is possible to exploit the information provided by a composition of the transformation matrices to provide estimates for motion vectors (or in some cases serve directly as motion vectors) at macroblock level granularity. These motion vectors would form the principal data needed to encode full motion-predicted P-frames.

On average, computing motion vectors directly for at 360× 240 pixel resolution involves approximately $10^{10}$ operations. Even with fast search algorithms, this is only reduced to $10^9$ or $10^8$ operations. By making use of the hints provided by affine transform matrices, the number of operations may be reduced, in some cases, substantially.

Insertion of a Pre-Encoded MPEG Stream

For some applications, it may be desirable to display a video stream that is comprised of graphics not generated from the tree 250 or package 224, but for example directly from the process 222, as part of the output. Such may be accommodated by incorporation of the ability to insert, on-the-fly, one or more separate pre-encoded MPEG streams into a stream generated by the encoder 226.

To achieve this, firstly an area consisting of an integral number of macroblocks of a frame output from the encoder 226 is set aside for video insertion (the macroblocks that comprise this area could be specially flagged so that they would be treated specially during an encoding pass). The MPEG stream to be inserted must be partially decoded to the extent that the macroblocks representing each frame are extracted, and manipulated so that they are in a format suitable for I-frame re-encoding. In some instances it may also be necessary to discard a certain number of macroblocks, since the insertion area, and the MPEG stream to be inserted, may not span equal numbers of macroblocks.

Once this has been done, inserting the semi-decoded video stream may be performed by simply copying macroblocks to their corresponding locations within the output frame for each frame update (and adjusting the DC delta coding accordingly), and then encoding an I-frame as a whole from the output frame as described above, the output frame being that provided from the application 210 to the set-top box 113.

Object Referenced Variable Quantisation

The various MPEG standards are flexible with regards to quantisation in that they allow variation of the quantisation matrix for each slice that comprises a frame. Since it is possible to obtain details of the exact buffer location of a set of composited objects using the buffer changes output 244 of the graphics package 224, this information may be used to dynamically adjust the amount of quantisation applied to slices that correspond to certain composited objects.

For instance, if it was known that a particular region of the screen was comprised of composited objects that did not have significant edges, or other sharp features/boundaries, then a large amount of quantisation could be applied (with a corresponding compression gain). Conversely, if a particular screen region was comprised of composited objects that had significant edges, or other sharp features/boundaries (such as text), then a small amount of quantisation could be applied, resulting in superior decoded picture quality.

Encoding System

A specific advantage in the use of the MPEG encoding system is that in the various MPEG standards, the standard is defined at the stream level rather than at the encoder level. As a consequence, system manufacturers and program material developers are free to develop MPEG applications that can operate in different ways provided that, when delivered to an appropriate MPEG decoder, that decoder is able to properly decode the stream. As a consequence, the standards of the MPEG system can be implemented within simple set-top boxes to provide for traditional MPEG decoding. Further, such an implementation permits the set-top box 114 to be modified and enhanced using application specific hardware and software to achieve modified forms of decoding essentially consistent with but providing alternate performance beyond that of traditional MPEG systems.

It follows therefore that the encoder 226 may be developed so as to apply any one or more of the foregoing methods of optimisation to achieve enhanced MPEG encoding of information required to be delivered to the user within the system 100 and, in particular, in response to the user's input commands. Such an arrangement finds particular utility in relation to those outputs that are essentially static, such as the menu driven displays of FIGS. 1B and 1C, or where the rate of update is small compared to continuously streamed video (whether encoded or not), such as shown in FIG. 1D. Such an arrangement is characterised in that it is the rendering from the graphics package that creates the encoded MPEG stream (ie. the rendering is encoded as a stream). The methods forming the MPEG stream described herein result in the generation of a stream in response to user's commands and that is consistent with the MPEG standards and thus able to be decoded using generic equipment formed within the set-top box 114. This is to be contrasted with prior art arrangements where extra data is packed into an existing MPEG stream (ie. rendering into the stream). Such prior art arrangements typically require proprietary hardware and/or software to filter out or otherwise extract the extra data at the decode end of the system (ie. the set-to box).

A specific application of the above described encoding arrangements and which may be implemented using the configurations of FIGS. 1 and 2, relates to browsing of the network 105 or of another network, where the browser is an application 210 operating from within the server computer 118. In this regard, where the network 105 is a special purpose network such as a cable-TV distribution arrangement, the "other" network may be the Internet, for example separately connected to the server 118. Alternatively, the network 105 may be the Internet or some similar arrangement. An advantage of such an arrangement is that it facilitates web-browsing without requiring the user to invest in substantial hardware and software products. Removing the web-browser and image generation functions to the server 118 enables the user-end of the system, comprising the set-top box 114, remote controller 106 and output device 116, to be formed of relatively inexpensive devices capable of simple operation and therefore offering substantially improved reliability and reduce start-up costs. The arrangement also permits the operator of the server computer 118, such as an Internet Service Provider or cable TV operator, to upgrade and/or modify the capabilities and power of the computer 118 without requiring alteration or upgrade of the user-end of the system.

Figure 13:
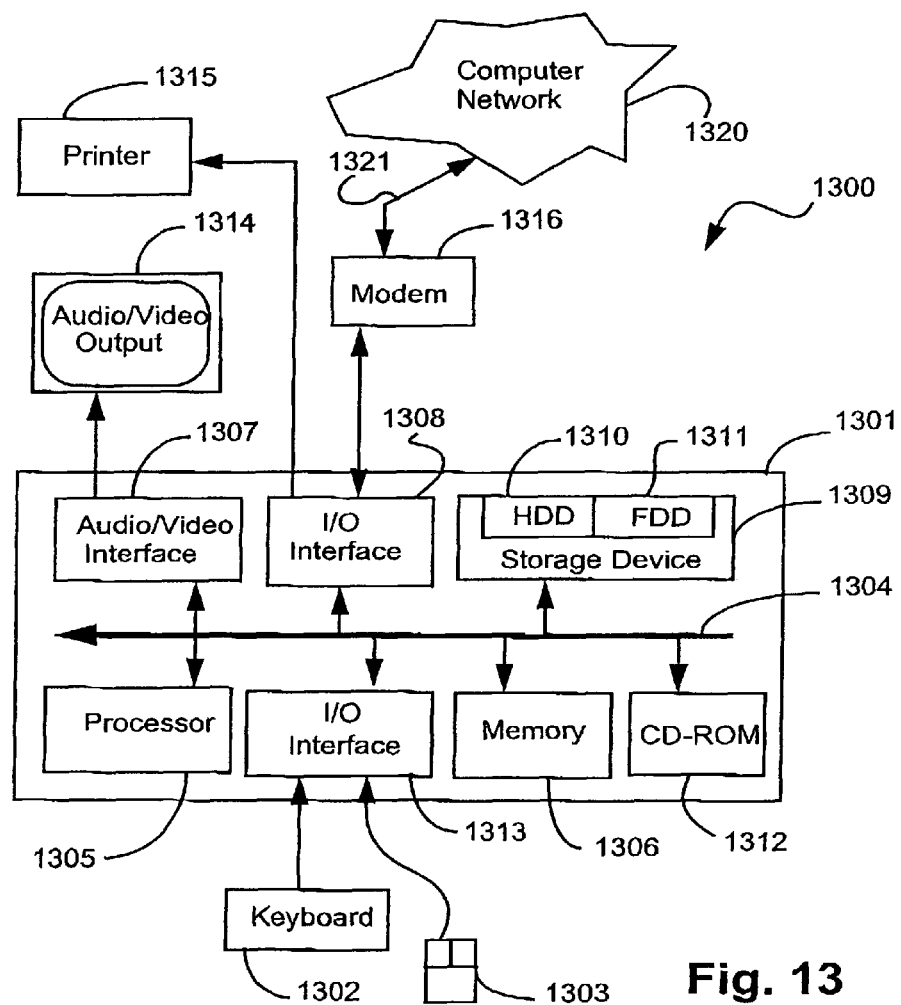
FIG. 13 is a schematic block diagram of a general purpose computer upon which the arrangements described can be practiced.

The methods of rendering and encoding described above are preferably practiced using a general-purpose computer system 1300, such as that shown in FIG. 13 wherein the processes of FIGS. 2 to 12, particularly those of the application 220 may be implemented as using hardware and/or software, for example one or more application programs executing within the computer system 1300, which may be configured as an application server. In particular, the steps rendering and encoding are effected by instructions in the software that are carried out by the computer. The software may be stored in a computer readable medium, including the storage devices described below, for example. The software may be loaded into the computer from the computer readable medium, and then executed by the computer. A computer readable medium having such software or computer program recorded on it is a computer program product. The use of the computer program product in the computer preferably effects an advantageous apparatus for encoding and decoding.

The computer system 1300 comprises a computer module 1301, input devices such as a keyboard 1302 and mouse 1303, output devices including a printer 1315 and a display device 1314. A Modulator-Demodulator (Modem) transceiver device 1316 is used by the computer module 1301 for communicating to and from a communications network 1320, for example connectable via a telephone line 1321 or other functional medium. The modem 1316 can be used to obtain access to the Internet, and other network systems, such as a Local Area Network (LAN) or a Wide Area Network (WAN).

The computer module 1301 typically includes at least one processor unit 1305, a memory unit 1306, for example formed from semiconductor random access memory (RAM) and read only memory (ROM), input/output (I/O) interfaces including a video interface 1307, and an I/O interface 1313 for the keyboard 1302 and mouse 1303 and optionally a joystick (not illustrated), and an interface 1308 for the modem 1316. A storage device 1309 is provided and typically includes a hard disk drive 1310 and a floppy disk drive 1311. A magnetic tape drive (not illustrated) may also be used. A CD-ROM drive 1312 is typically provided as a non-volatile source of data. The components 1305 to 1313 of the computer module 1301, typically communicate via an interconnected bus 1304 and in a manner which results in a conventional mode of operation of the computer system 1300 known to those in the relevant art. Examples of computers on which the described arrangements can be practised include IBM-PC's and compatibles, Sun Sparcstations or alike computer systems evolved therefrom.

Typically, the application program is resident on the hard disk drive 1310 and read and controlled in its execution by the processor 1305. Intermediate storage of the program and any data fetched from the network 1320 may be accomplished using the semiconductor memory 1306, possibly in concert with the hard disk drive 1310. In some instances, the application program may be supplied to the user encoded on computer readable storage media, such as a CD-ROM or floppy disk and read via the corresponding drive 1312 or 1311, or alternatively may be read by the user from the network 1320 via the modem device 1316. Still further, the software can also be loaded into the computer system 1300 from other computer readable storage media medium including magnetic tape, a ROM or integrated circuit, a magneto-optical disk and a computer readable card such as a PCMCIA card. Computer readable transmission media that may also provide the application program to the computer 1301 include a radio or infra-red transmission channel between the computer module 1301 and another device, and the Internet and Intranets including e-mail transmissions and information recorded on Websites and the like. The foregoing is merely exemplary of relevant computer readable media. Other computer readable media may alternately be used.

The various applications 210 as discussed above may operate within a server computer 118 which may include many of the traditional features found in computer like devices such as the computer system 1300 shown in FIG. 13. Further, the set-top box 114 may include much of the arrangement of the computer module 1301 of FIG. 13 noting that in such arrangements, typically a floppy disk drive, hard disk drive, or CD ROM drive would not typically be required. In particular, where the computer system 1300 of FIG. 13 is configured to operate the applications 210, various encoding steps may be performed within the computer module 1301. Similarly, where such arrangement is formed within the set-top box 114, corresponding decoding arrangements may be performed thereby.

The rendering, encoding and/or decoding methods described may alternatively be implemented in dedicated hardware such as one or more integrated circuits performing the functions or sub functions described above. Such dedicated hardware may include graphic processors, digital signal processors, or one or more microprocessors and associated memories and operate in concert with software components. It will be further appreciated that a mix of hardware and software implemented processes may utilized to achieve the encoded bitstream described.

INDUSTRIAL APPLICABILITY

It is apparent from the above that the arrangements described are applicable to the computer and data processing industries and particularly where data from a variety of data sources is being encoded or compressed.

The foregoing describes only some embodiments of the present invention, and modifications and/or changes can be made thereto without departing from the scope and spirit of the invention, the embodiments being illustrative and not restrictive.

I claim:

1. A computer-implemented method of encoding a first image and a second image in a sequence of images of a video stream for transmission over a communication network, said computer running an object-based computer graphics application, the method comprising the steps of:
   (i) rendering a first portion of the first image from a display list in the object-based computer graphics application;
   (ii) encoding the first portion according to a predetermined encoding scheme;
   (iii) rendering a second portion of the second image at a corresponding location of the first portion from the display list in the object-based computer graphics application;
   (iv) interpreting the display list in the computer graphics application to identify changes between the first image and the second image and an attribute of an object at the location of the rendered portion; and
   (v) using the identified changes and the attribute of the object to determine an amount of quantization in which the second image is encoded according to the predetermined encoding scheme.

2. A method according to claim 1, further comprising the step of interpreting the display list to identify an extent of change in a pixel-based representation of the rendered portion thereby enabling said encoding according to the predetermined encoding scheme of substantially only pixels that have changed.

3. A method according to claim 2, further comprising, for a first image of a determinable sequence of images, storing an encoded version of the first image with a flag identifiable by the extent of change such that the extent of change allows retrieval of the stored encoded first image for transmission.

4. A method according to claim 3, wherein the extent of change for a subsequent rendered image in the sequence is compared with the stored encoded first image and wherein the encoded first image is stored as a plurality of separately encoded portions and the extent of change for a subsequent rendered image is used to encode only the portions that have changed.

5. A method according to claim 1, wherein if the second image is identical to the first image, said encoding comprises encoding a special image indicator representative of no-change in the sequence at the second image.

6. A method according to claim 5, wherein the encoded preceding image comprises a plurality of slices in raster scan order each formed of plural of the discrete portions, the indicator being provided for a slice of the image, wherein the discrete portions that have not changed are encoded within each slice using motion vectors set to zero.

7. Apparatus for encoding a first image and a second image in a video stream for transmission over a communication network, said apparatus comprising:
   a graphics processor, adapted to form display list representations of plural graphic object-based images including the first image and the second image by executing an object-based computer graphics application;
   a renderer, adapted to render from the display list a first portion of the first image and a second portion of the second image at a corresponding location of the first image;
   an interpreter configured to interpret the display list in the computer graphics application to identify changes between the first image and the second image and an attribute of an object at the location of the rendered portion; and
   an encoder, adapted to encode the first portion according to a predetermined encoding scheme and to use the identified change and the attribute of the object to determine an amount of quantization in which the second image is encoded according to the predetermined encoding scheme.

8. Apparatus according to claim 7, wherein the interpreter is further configured to interpret the display list to identify an extent of change in a pixel-based representation of the rendered portion thereby enabling the encoding according to the predetermined encoding scheme of substantially only pixels that have changed.

9. Apparatus according to claim 8, wherein the encoder further comprises, for a first image of a determinable sequence of images, means for storing an encoded version of the first image with a flag identifiable by the extent of change such that the extent of change allows retrieval of the stored encoded first image for transmission.

10. Apparatus according to claim 9, wherein an extent of change for a subsequent rendered image in the sequence is compared with the stored encoded first image and wherein the encoded first image is stored as a plurality of separately encoded portions and the extent of change for a subsequent rendered image is used to encode only the portions that have changed.

11. Apparatus according to claim 9, wherein if the second image is identical to the preceding first image, said encoder encodes an image indicator representative of no-change in the sequence at the second image.

12. Apparatus according to claim 11, wherein the encoded preceding first image comprises a plurality of slices in raster scan order each formed of plural of the discrete portions, the indicator being provided for a slice of the image, wherein the discrete portions that have not changed are encoded within each slice using motion vectors set to zero.

13. A computer readable storage medium having a program recorded thereon, the program being executable in a computer to encode a first image and a second image in a sequence of images of a video stream for transmission over a communication network, said computer running an object-based computer graphics application, the program comprising:
   code for rendering a first portion of the first image from a display list in the object-based computer graphics application;
   code for encoding the first portion according to a predetermined encoding scheme;
   code for rendering a second portion of the second image at a corresponding location of the first portion from the display list in the object-based computer graphics application;
   code for interpreting the display list in the computer graphics application to identify changes between the first image and the second image and an attribute of an object at the location of the rendered portion; and
   code for using the identified changes and the attribute of the object to determine an amount of quantization in which the second image is encoded according to the predetermined encoding scheme.

14. A computer readable storage medium according to claim 13, wherein the program further comprises code for interpreting the display list to identify an extent of change in a pixel-based representation of the rendered portion thereby enabling the encoding according to the predetermined encoding scheme of substantially only pixels that have changed.

15. A computer readable storage medium according to claim 14, further comprising, for a first image of a determinable sequence of images, code for storing an encoded version of the first image with a flag identifiable by the extent of change such that the extent of change allows retrieval of the stored encoded first image for transmission.

16. A computer readable storage medium according to claim 15, wherein the extent of change for a subsequent rendered image in the sequence is compared with the stored encoded first image and wherein the encoded first image is stored as a plurality of separately encoded portions and the extent of change for a subsequent rendered image is used to encode only those the portions that have changed.

17. A computer readable storage medium according to claim 13, wherein, if the second image is identical to the first image, said code for encoding is operative to encode a special image indicator representative of no-change in the sequence at the second image.

18. A computer readable storage medium according to claim 17, wherein the encoded preceding image comprises a plurality of slices in raster scan order, each formed of plural of the discrete portions, the indicator being provided for a slice of the image, wherein the discrete portions that have not changed are encoded within each slice using motion vectors set to zero.

* * * * *